United States Patent
Jia et al.

(10) Patent No.: US 10,208,384 B2
(45) Date of Patent: Feb. 19, 2019

(54) EFFICIENT WATER OXIDATION CATALYSTS AND METHODS OF OXYGEN AND HYDROGEN PRODUCTION BY PHOTOELECTROLYSIS

(75) Inventors: Hongfei Jia, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1806 days.

(21) Appl. No.: 13/207,998

(22) Filed: Aug. 11, 2011

(65) Prior Publication Data

US 2013/0037417 A1 Feb. 14, 2013

(51) Int. Cl.
  C25B 1/00 (2006.01)
  C02F 1/461 (2006.01)
  C02F 1/467 (2006.01)

(52) U.S. Cl.
  CPC .......... *C25B 1/003* (2013.01); *C02F 1/46109* (2013.01); *C02F 1/4672* (2013.01); *C02F 2001/46138* (2013.01); *Y02E 60/368* (2013.01)

(58) Field of Classification Search
  CPC .... C25B 1/003; C02F 1/46109; C02F 1/4672; C02F 2001/46138; Y02E 60/368
  USPC ....................................................... 205/340
  See application file for complete search history.

(56) References Cited

U.S. PATENT DOCUMENTS

| | | | | |
|---|---|---|---|---|
| 3,234,110 A * | 2/1966 | Beer | ............................ | 205/183 |
| 4,061,549 A * | 12/1977 | Hazelrigg et al. | ............ | 205/535 |
| 4,061,555 A * | 12/1977 | Miyatani et al. | ............. | 205/340 |
| 4,144,147 A * | 3/1979 | Jarrett et al. | .................. | 205/340 |
| 4,311,569 A | 1/1982 | Dempsey et al. | | |
| 4,329,219 A * | 5/1982 | Druzhinin et al. | ...... | 204/290.12 |
| 4,396,485 A * | 8/1983 | Gordon et al. | ......... | 204/290.12 |
| 4,427,749 A * | 1/1984 | Graetzel et al. | ............. | 429/111 |
| 4,428,805 A * | 1/1984 | Caldwell et al. | ............. | 205/635 |
| 4,460,443 A * | 7/1984 | Somorjai et al. | ............. | 205/340 |
| 4,466,869 A * | 8/1984 | Ayers | ............................ | 205/340 |
| 5,098,546 A * | 3/1992 | Kawashima et al. | .... | 204/290.09 |
| 5,314,601 A * | 5/1994 | Hardee et al. | ........... | 204/290.03 |
| 6,689,262 B2 * | 2/2004 | Senkiw | ........................ | 205/628 |

(Continued)

FOREIGN PATENT DOCUMENTS

| AU | 2003304222 A1 | 1/2005 |
|---|---|---|
| AU | 2004257205 A1 | 1/2005 |

(Continued)

OTHER PUBLICATIONS

Honji et al, "Anodic characteristics of Fe-supported Co3O4 electrodes in alkaline solution," Chemistry Letters, pp. 1153-1156, 1979 (Chem. Soc. Japan).*

(Continued)

*Primary Examiner* — Nicholas A Smith
*Assistant Examiner* — Colleen M Raphael
(74) *Attorney, Agent, or Firm* — Dinsmore & Shohl LLP

(57) ABSTRACT

Processes for the liberation of oxygen and hydrogen from water are provided allowing for mass scale production using abundant sources of catalyst materials. A metal oxide based anode is formed by the simple oxidation of metal in air by heating the metal for a specified time period. The resultant anode is then contacted with water and subjected to a voltage from an external source or driven by electromagnetic energy to produce oxygen at the surface of the anode by oxidation of water. These processes provide efficient and stable oxygen or hydrogen production.

16 Claims, 6 Drawing Sheets

(56) References Cited

U.S. PATENT DOCUMENTS

| | | | |
|---|---|---|---|
| 7,884,044 | B2 | 2/2011 | DiFranco et al. |
| 7,932,230 | B2 | 4/2011 | McDaniel |
| 7,939,500 | B2 | 5/2011 | McDaniel |
| 8,188,362 | B2 * | 5/2012 | Kaneko ............... 136/248 |
| 8,388,904 | B1 | 3/2013 | McDaniel et al. |
| 8,394,618 | B2 | 3/2013 | Buthe et al. |
| 8,497,248 | B2 | 7/2013 | McDaniel |
| 8,618,066 | B1 | 12/2013 | McDaniel |
| 2004/0109853 | A1 | 6/2004 | McDaniel |
| 2004/0164067 | A1 * | 8/2004 | Badami et al. ........... 219/494 |
| 2004/0175407 | A1 | 9/2004 | McDaniel |
| 2005/0189234 | A1 * | 9/2005 | Gibson et al. ........... 205/340 |
| 2006/0229466 | A1 | 10/2006 | Arhancet et al. |
| 2009/0074611 | A1 * | 3/2009 | Monzyk ............. B01J 19/123 422/187 |
| 2009/0130502 | A1 | 5/2009 | Liu et al. |
| 2009/0305090 | A1 | 12/2009 | Chuang |
| 2010/0133110 | A1 * | 6/2010 | Nocera et al. ........... 205/340 |
| 2010/0133111 | A1 | 6/2010 | Nocera et al. |
| 2010/0210745 | A1 | 8/2010 | McDaniel et al. |
| 2010/0248334 | A1 | 9/2010 | McDaniel |
| 2011/0240064 | A1 | 10/2011 | Wales et al. |
| 2011/0250626 | A1 | 10/2011 | Williams et al. |
| 2011/0318656 | A1 * | 12/2011 | Hago ................... C01B 25/37 429/405 |
| 2012/0097194 | A1 | 4/2012 | McDaniel et al. |
| 2013/0008495 | A1 * | 1/2013 | Jun et al. ................ 136/255 |
| 2013/0065291 | A1 | 3/2013 | Jia et al. |
| 2013/0137159 | A1 | 5/2013 | Buthe et al. |
| 2014/0083324 | A1 | 3/2014 | Wales |

FOREIGN PATENT DOCUMENTS

| | | | |
|---|---|---|---|
| CA | 2538124 | A1 | 12/2004 |
| EP | 0538955 | A1 | 4/1993 |
| EP | 1551927 | A1 | 7/2005 |
| EP | 1644452 | A2 | 4/2006 |
| EP | 1660596 | A1 | 5/2006 |
| GB | 2410249 | A | 7/2005 |
| GB | 2430436 | A | 3/2007 |
| IL | 167413 | A | 12/2010 |
| IL | 174122 | A | 9/2011 |
| IL | 173658 | A | 4/2012 |
| IL | 208769 | A | 4/2012 |
| IL | 214668 | A | 1/2013 |
| IL | 214669 | A | 1/2013 |
| IL | 214670 | A | 1/2013 |
| IL | 214671 | A | 1/2013 |
| IL | 214672 | A | 1/2013 |
| IL | 218129 | A | 9/2013 |
| JP | S58-136789 | A | 8/1983 |
| JP | 2004-186320 | A | 7/2004 |
| JP | 2006256901 | A * | 9/2006 |
| KR | 101075876 | B1 * | 9/2011 |
| WO | 2010042196 | A1 | 4/2010 |

OTHER PUBLICATIONS

Schumacher et al, "Indium oxide, oxygen photoanode of high quantum efficiency," J. of the Electrochemical Soc., 1985 vol. 132, issue 9, pp. 2299-2300.*

Hamdani et al, "Physicochemical and electrocatalytic properties of Li—$Co_3O_4$ anodes prepared by chemical spray pyrolysis for application in alkaline water electrolysis," Electrochimica Acta 49 (2004) pp. 1555-1563.*

Unuma et al, "Preparation of $Co_3O_4$ thin films by a modified chemical-bath method," Thin Solid Films 468 (2004) 4-7.*

Steinmiller et al, "Photochemical deposition of cobalt-based oxygen evolving catalyst on a semiconductor photoanode for solar oxygen production," PNAS Dec. 8, 2009 vol. 106, No. 49, pp. 20633-20636.*

Definition of "anionic," Merriam-Webster, available at http://www.merriam-webster.com/dictionary/anionic.*

Kay et al, "New Benchmark for Water Photooxidation by Nanostructured $\alpha$-$Fe_2O_3$ Films," J. Am. Chem. Soc. 2006, vol. 128, pp. 15714-15721.*

Jeon et al, "Printed $Co_3O_4$ film as an electrocatalyst for hydrogen production by a monolithic photovoltaic-electrolysis system," International journal of hydrogen energy 36 (2011) 1924-1929 (Year: 2011).*

Woodhouse et al, "Combinatorial Discovery and Optimization of a Complex Oxide with Water Photoelectrolysis Activity," Chem. Mater. 2008, vol. 20, pp. 2495-2502 (Year: 2008).*

Ye et al, "Screening of Electrocatalysts for Photoelectrochemical Water Oxidation on W-Doped $BiVO_4$ Photocatalysts by Scanning Electrochemical Microscopy," J. Phys. Chem. C, 2011 vol. 115, pp. 12464-12470 (Year: 2011).*

Shao et al, "Fabrication of nanometer-sized zinc oxide at low decomposing temperature," J. of Materials Processing Tech. 178 (2006) pp. 247-250 (Year: 2006).*

Abstract of KR101075876 (KR20110107112A) (Year: 2011).*

Feng Jiao et al.; Nanostructured Cobalt Oxide Clusters in Mesoporous Silica as Efficient Oxygen-Evolving Catalysts; Angewandte Chemie; 2009; pp. 1841-1844.

Matthew W. Kanan et al.; In Situ Formation of an Oxygen-Evolving Catalyst in Neutral Water Containing Phosphate and Co2+; Science; www.sciencemag.org; vol. 321; Aug. 2008.

Ting Yu et al.; Metal Oxide Nanostructures from Simple Metal-Oxygen Reaction in Air; J. Mater. Sci. Technol., vol. 24.; No. 4; 2008; pp. 597-602.

Kent N. Hutchings et al.; Kinetic and Thermodynamic Considerations for Oxygen Absorption/Desorption Using Cobalt Oxide; ScienceDirect.

By New Staff; Cobalt Oxide Nanocrystals and Artificial Photosynthesis; Scientific Blogging Science 2.0; Mar. 2009.

U.S. Appl. No. 12/643,666, filed Dec. 21, 2009.

U.S. Appl. No. 14/097,128, filed Dec. 4, 2013.

Yu, Ting, et al., "Controlled Growth and Field-Emission Properties of Cobalt Oxide Nanowalls", Advanced Materials, 2005; 17: pp. 1595-1599.

Souza, Flavio Leandro et al., "The influence of the film thickness of nanostructured a-$Fe_2O_3$ on water photooxidation" Physical Chemistry Chemical Physics, 2009, vol. 11, pp. 1215-1219.

Mohapatra, Susanta K., "Water Photooxidation by Smooth and Ultrathin a-$Fe_2O_3$ Nanotube Arrays", Chemistry of Materials, 2009, vol. 21, No. 4, pp. 3048-3055.

Cheng, Ping et al., "Recent Advances in Visible-Light Responsive Titania Photocatalyst", Materials Review, vol. 18, No. 7, pp. 76-79, 2004.

* cited by examiner

EFFICIENT WATER OXIDATION CATALYSTS AND METHODS OF OXYGEN AND HYDROGEN PRODUCTION BY PHOTOELECTROLYSIS

FIELD OF THE INVENTION

This disclosure relates to efficient processes of water oxidation and catalysts that are readily formed, efficient, and commercially viable for large scale energy production or storage. Electrochemical devices are used herein for the catalytic formation of gaseous oxygen or hydrogen from water.

BACKGROUND OF THE INVENTION

The demand for transportation fuels is expected to increase dramatically in the next 50 years due to the current increases in population as well as improvements in the developing world. Fossil fuels supply more than 70% of current transportation energy consumption due to its ready availability and relatively inexpensive cost. Fossil fuels may temporarily be capable of meeting the future increases in demand, but due to their link to increased concentrations of $CO_2$ in atmosphere, continued use of fossil fuels is expected to result in unpredictable and possibly damaging climate changes. Thus, alternative fuels or energy from clean resources are urgently needed. Among the various possible clean fuel sources, solar stands out as the most promising to meet the terra-Watts level energy gap expected in the near future. Lewis N. S. and G. Nocera Daniel, *Proc Natl Acad Sci USA,* 2006; 103(43):15729-35.

One difficulty facing solar as a transpiration energy source is its requirement for robust incident sunlight. Methods of storing solar energy in an efficient manner are currently lacking. Splitting water using solar energy represents the ideal pathway to store and utilize solar energy as transportation fuel. Technical approaches to solar water splitting either fall into the category of thermal or thermochemical cycles, or follow the photoelectrochemcial routes. Both approaches are under rapid development, with much study into new catalysts for the oxidation half of the water splitting process.

In native photosynthesis, water oxidation is facilitated by Mn-containing ligands at the oxygen evolving center of PSII. Though highly efficient, the ligands are unstable under the extremely oxidative conditions of artificial systems, and need to be re-generated quickly to maintain the continuous operation of photosynthesis. Also, in artificial photosynthetic systems in situ re-generation of catalysts is almost impossible. The $RuO_2$ and $IrO_2$ catalysts are among the best known of prior catalysts for these artificial systems. These complexes, however, are inappropriate for use on a large scale due to the low natural abundance of the materials. Therefore, there is a need for efficient, stable and readily available catalysts for water oxidation and processes using these catalysts for efficient water oxidation reactions.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Processes are provided for the production of oxygen and/or hydrogen gas by water electrolysis including forming a metal oxide based electrode wherein the metal oxide includes a metal ionic species and an oxygen anionic species. The forming includes heating a metal ionic species to 400 degrees Celsius or less for an oxidation time in the presence of oxygen. Oxygen is produced from water by contacting the electrode with water in the presence of a voltage within the electrode. The voltage is optionally created by illumination of the electrode with electromagnetic radiation such as solar or artificial light, or by application of a voltage from an external power source such as a photovoltaic cell or other artificial source.

A metal ionic species is one or more of several metals illustratively including Co, Fe, Zn, and Cu. In some embodiments, the metal ionic species is $Co^{2+}$ or $Co^{3+}$. The resulting metal oxide is optionally $Co_3O_4$. In some embodiments, more than one metal ionic species is present and each is heated for an oxidation time to produce a multi metal oxide based electrode. Optionally, two metal ionic species are used, optionally Co and Fe.

The process of forming the electrode is optionally achieved by heating the metal ionic species to a temperature from 250 degrees Celsius to 400 degrees Celsius. Some embodiments heat the metal ionic species at 350 degrees Celsius. The oxidation time is optionally 2 hours or more, optionally from 3 to 6 hours. The oxygen is from any oxygen containing source, optionally air. The oxygen is optionally purified.

An anode optionally includes a substrate that is coated or embedded with a metal ionic species or metal oxide. In some embodiments, a substrate is a silicon bead or a CuO nanowire.

DETAILED DESCRIPTION OF EMBODIMENTS OF THE INVENTION

Figure 1:
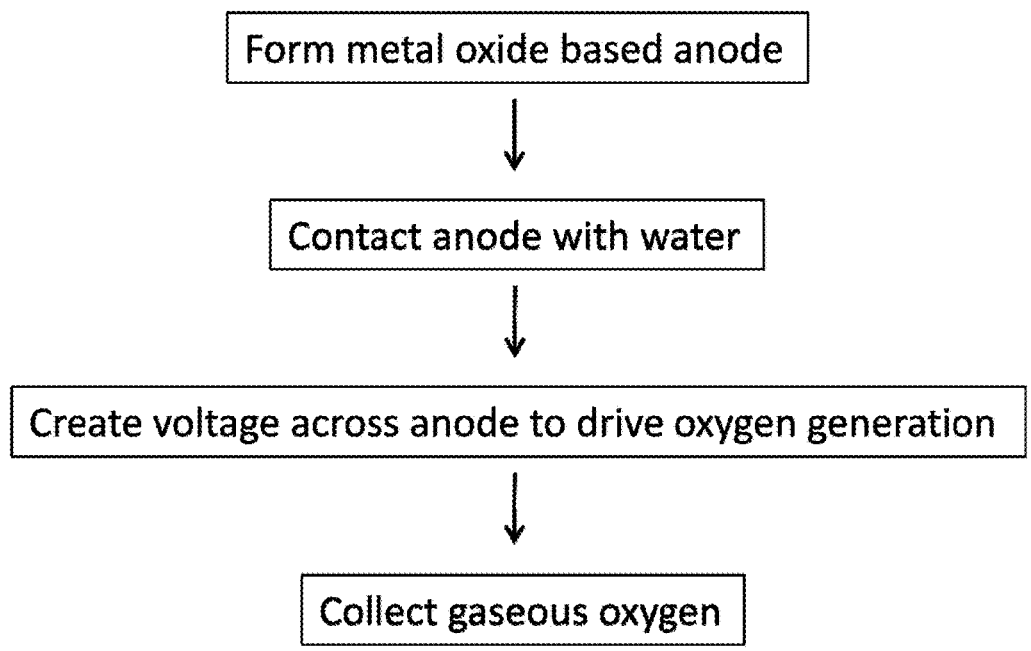
FIG. 1 presents a process of producing oxygen gas from water according to one embodiment of the invention.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the process is described as an order of individual steps or using specific materials, it is appreciated that described steps or materials may be interchangeable such that the description of the invention includes multiple parts or steps arranged in many ways as is readily appreciated by one of skill in the art.

The invention has utility as processes for the efficient and scalable production of fuels as well as electrodes for the production of electrical or chemical energy. Processes are provided that address the long felt need for oxygen or hydrogen gas production using an easily generated catalytic surface. A metal oxide based catalyst is produced and used in an artificial photosynthetic system or water electrolysis system for the production of gaseous oxygen, hydrogen, or both. The water oxidation catalysts provided are metal based compounds, optionally metal oxides. Metal based electrodes have promise for catalyzing water electrolysis. For example, electrochemically synthesized Co phosphate was demonstrated to catalyze water oxidation at low overpotential. Kanan, M. W. and D. G. Nocera, *Science,* 2008; 321(5892): 1072-1075. Jiao and Frei from Lawrence Berkeley National Lab also demonstrated that $Co_3O_4$ nanoclusters could drive water oxidation to a turnover rate comparable to native photosynthesis. Jiao, H F, *Angewandte Chemie International Edition,* 2009; 48(10):1841-1844. The Jiao and Frei conditions for production of the electrode are complicated and difficult to perform at large enough scales for viable mass energy storage. A much simpler method of synthesizing nano-structured $Co_3O_4$ was recently reported, but unappreciated as an efficient catalyst for water splitting. Yu, T., *J. Mater. Sci. Technol,* 2008; 24(4): 597-602.

Overall, the splitting of water is not thermodynamically favored. The oxidation reaction at an anode is described by the following equation:

$$2H_2O(l) \rightarrow O_2(g) + 4H^+(aq) + 4e^- \quad (I)$$

where $E°_{ox} = -1.23V$ at standard temperature and pressure. This equates to a positive Gibbs free energy indicating the need for external energy supplied to the system to split the water. The external energy is supplied in the form of electricity or light energy.

Metal oxide catalysts serve to reduce the additional energy (i.e. overpotential) required to oxidize water. A catalyst is most effective if it operates at a voltage close to the thermodynamic value (E°) of the associated half reaction. Thus, a catalyst that operates near to 1.23 eV will provide the greatest efficiency. Illustratively, a metal oxide acts as a catalyst. The metal oxides formed as part of the processes described herein have much reduced overpotential than standard platinum wire or other anodes.

A catalyst should also have sufficient stability and operate with relatively low overpotential. It is desirable that a catalyst be formed from abundant earth elements so that the formation of a catalyst is inexpensive and suitable for large scale production. Finally, a suitable catalyst can desirably tolerate prolonged exposure to oxidizing conditions required at the anode. The primary consideration in creating processes for efficient and robust water electrolysis or photochemical splitting is the cost and ability to produce systems on a large scale—a problem that is compounded by a disconnect between researchers studying processes of catalyst formation and those studying energy production. The processes described herein address the long felt need for a readily mass producible process using readily abundant starting materials and recognizing their ability as catalysts for oxygen or hydrogen gas production or the production of organic fuels such as methanol.

Processes of producing oxygen or hydrogen from water are provided that include forming a metal oxide based electrode and contacting the electrode with water under suitable conditions to split the water into gaseous oxygen. The processes provided address the long felt need for an efficient method of producing fuels for satisfaction of energy demand that does not require fossil fuels.

In some embodiments, an inventive process includes forming a metal oxide based electrode where the metal oxide includes a metal ionic species and an oxygen ionic species that combine to form the metal oxide. The processes of forming the electrode are simple and easy to accomplish without specialized equipment. Illustratively, a metal ionic species is heated in the presence of an oxygen containing atmosphere such that metal oxides form. The resultant metal oxides are then contacted with water under conditions to split the water into oxygen and hydrogen. The electrode formed is used as an anode to catalyze a water electrolysis reaction.

In some embodiments, additional energy required to split water is provided by electromagnetic radiation of sufficient intensity and appropriate wavelength to liberate oxygen gas from water. The metal oxide based catalyst is exposed to electromagnetic radiation in the presence of water. Light excites the semiconducting material in the anode resulting in the formation of electronic charged carriers (e.g. electron/hole pairs). Water is oxidized by the electron holes produced at the anode in the presence of the formed metal oxide electrocatalyst forming oxygen gas. A second electrode (negatively biased relative to the anode) allows the combination of electrons with the liberated hydrogen to reduce the hydrogen forming hydrogen gas.

A metal oxide based electrode is formed whereby the metal oxide includes a metal ionic species and an oxygen ionic species. The metal ionic species is optionally in an oxidized form, illustratively with an oxidation state of (n), where (n) is one, two, three, or greater. Optionally, the metal ionic species has access to an oxidation state greater than (n), for example, (n+1) and/or (n+2). (n) may be any whole number, and includes, but is not limited to, 0, 1, 2, 3, 4, 5, 6, 7, 8, among others. In some cases, (n) is not zero. In some embodiments, (n) is 1, 2, 3 or 4. (x) may be any whole number illustratively 0, 1, 2, 3, 4, among others. Optionally, (x) is 1, 2, or 3. Other considerations for a metal ionic species are illustrated in U.S. Patent Application Publication No. 2010/0133111.

Illustrative examples of metal ionic species include Sc, Ti, V, Cr, Mn, Fe, Co, Ni, Cu, Y, Zr, Nb, Mo, Tc, Rh, Ru, Ag, Cd, Pt, Pd, Jr, Hf, Ta, W, Re, Os, and Hg. A metal ionic species is optionally a lanthanide or actinide (e.g., Ce, Pr, Nd, Sm, Eu, Gd, Tb, Dy, Ho, Er, Tm, Yb, Lu, Th, Pa, U, etc.). In some embodiments, the metal ionic species includes cobalt ions. Cobalt ions are optionally in the form of Co(II) or Co(III). In some embodiments, the metal ionic species is not Mn, Fe, Cu, Jr, or Rh. Optionally, a metal oxide includes more than one metal ionic species. Optionally, 2, 3, 4, 5, 6, or more metal ionic species are included. Optionally, a metal oxide includes both Co and Fe. In some cases, a metal ionic species is only Co, or only a combination of Co and Fe.

The processes of the invention provide inexpensive formation of a metal oxide based electrode using earth abundant elements. Essential to this process is the oxidation of the metal ionic species with a readily available anionic species. In contrast to prior large scale systems, the anionic species of the metal oxides used in the processes described herein are oxygen anionic species. As such, the anodes formed in the processes include a metal oxide that acts as a catalyst for electrochemical or photochemical water splitting reactions in the production of oxygen gas or hydrogen gas.

The metal oxide may have the metal ionic species and anionic species combined in one or more metal:oxide ratios (amounts relative to each other). Optionally, the metal ionic species and the anionic species are formed in a ratio of: less than or at 20:1, 15:1, 10:1, 7:1, 6:1, 5:1, 4:1, 3:1, 2:1; or greater than or at 1:1, 1:2, 1:3, 1:4, 1:5, 1:10; among other ratios.

In some embodiments, the metal oxide may include one or more additives such as counter cations and/or counter anions. Illustratively, the metal ionic species, the anionic species, and a counter cation and/or anion are in a ratio of 2:1:1, 3:1:1, 3:2:1, 2:2:1, 2:1:2, or 1:1:1. When an additive is present as a dopant, the ratio is optionally X:1:0.1, X:1:0.005, X:1:0.001, X:1:0.0005, etc., where X is 1, 1.5, 2, 2.5, or 3, among others. Each ratio described within the specification is appreciated to be within manufacturing or experimental error and can vary to a degree as desired so as not to substantially alter the characteristics of the metal oxides with the exact ratios described herein.

In some embodiments, a metal oxide based electrode is formed to include more than one type of metal ionic species. The number of metal ionic species is optionally 2 types, 3 types, 4 types, 5 types, or more. In some embodiments, a first type of metal ionic species is Co and second type of metal ionic species is Ni or Fe. Where a first and second type of metal ionic species are used together, each can be selected from among metal ionic species described herein.

The ratio of the first type of metal ionic species to the second type of metal ionic species may be varied are illustratively 1:1, 1:2, 1:3, 1:4, 1:5, 1:6, 1:7, 1:8, 1:9, 1:10, 1:20, or greater. In some embodiments, the second type of species is present in a very small amount so as to serve as a dopant, for example, to alter the conductivity or other properties of the material. In these instances, the ratio of the first type of metal ionic species to the second type of metal ionic species may be 1:0.1, 1:0.005, 1:0.001, 1:0.0005, etc.

A process includes the formation of an electrode including a metal oxide. Processes of forming an electrode are accomplished by providing a metal ionic species in a suitable form so as to be exposable to a gas containing oxygen. In some embodiments, a process of forming an electrode is described in Yu T, and Shen, Z, *J. Mater. Sci. Technol.*, 2008; 24(4): 597-602. As described herein, the inventors have improved upon these methods providing electrodes with superior characteristics.

An electrode with a metal oxide is formed by providing a metal ionic species where the metal ionic species is not in a liquid, heating the metal ionic species to an oxidation temperature for an oxidation time in the presence of a gas including oxygen. Suitable oxidation temperatures are optionally from 200° C. to 400° C. The temperature is optionally 200, 225, 250, 275, 300, 325, 350, 375, 400° C., or any value or range between 200° C. and 400° C. In some embodiments the temperature of heating is 350° C.

The metal ionic species is heated for an oxidation time. An oxidation time is optionally between 1 hour and 10 or more hours. An oxidation time is optionally 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, or more hours, or any value or range between 0.10 and 10 hours. In some embodiments, the oxidation time is from 3 to 6 hours and is not in excess of 6 hours. Optionally, the oxidation time is 4 hours. The inventors discovered that oxidation time in excess of 6 hours does not further enhance formation of the metal oxide nanostructures. The metal oxide nanostructures are observed forming within 5 minutes of heating. In some embodiments, the oxidation time is 2 hours or less. While oxidation time in excess of 6 hours does not further enhance nanostructure formation, the processes described herein are capable of producing excellent metal oxide nanostructures in 2 hours or less. As such, in some embodiments the oxidation time is 2 hours or less.

The heating of a metal ionic species is performed in a gas that has includes or is solely oxygen described herein as an oxidation gas. Illustratively, an oxidation gas is purified oxygen or an oxygen containing gas. Illustratively an oxygen containing gas is air. Other components of an oxidation gas optionally include nitrogen, argon, carbon dioxide, ozone, methane, neon, helium, hydrogen, krypton, or other gaseous component. The percentage of oxygen in an oxidation gas is optionally from 0.1% to 100%, or any value or range therebetween by volume. In some embodiments, the oxidation gas is at least 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, or more by volume.

A metal oxide is optionally formed on a substrate to form an electrode such as an anode. A substrate is any material suitable for including or forming a metal oxide, a photoactive material, or combinations thereof. A substrate material may be conductive or non-conductive. Illustrative examples include of materials used as a substrate illustratively include: inorganic substrates such as quartz, glass, etc; and polymeric substrates such as polyethylene terephthalate, polyethylene naphthalate, polycarbonate, polystyrene, polypropylene, etc.; and conductive materials such as metal, metal oxides, etc. Illustrative examples of a substrate used in some embodiments include silicon bead(s) or nanowires such as CuO based nanowires.

An electrode can be in one or more of a variety of shapes. Illustrative examples of electrode shapes include foils, sheets, ribbons, wires, spheres, cubes, cylinders, hollow tubes, foams, mesh, fabric, or any other two or three dimensional shape. In some embodiments, an electrode is in the form of a foil or a wire. The size of an electrode is optionally any suitable size further illustrating how the invention satisfies the long felt need in the art for a method of liberating oxygen from water at significant scales such as scales that are commercially viable. Additionally, the electrode may include one or more connectors or connections to another electrode, a power source and/or another electrical device.

A photoactive composition is optionally imbedded within or coated onto a substrate material. Illustrative examples of photoactive compositions are illustratively found in U.S. Patent Application Publication No: 2010/0133111. Illustratively, such materials may be transparent, substantially transparent, substantially opaque, or opaque. The photoactive material is optionally solid, semi-porous or porous. Illustrative examples of photoactive compositions include $TiO_2$, $WO_3$, $SrTiO_3$, $TiO_2$—Si, $BaTiO_3$, $LaCrO_3$—$TiO_2$, $LaCrO_3$—$RuO_2$, $TiO_2$—$In_2O_3$, GaAs, GaP, p-GaAs/n-GaAs/pGa$_{0.2}$In$_{0.48}$P, AlGaAs/SiRuO$_2$, PbO, FeTiO$_3$, KTaO$_3$, MnTiO$_3$, SnO$_2$, Bi$_2$O$_3$, Fe$_2$O$_3$ (including hematite), ZnO, CdS, MoS$_2$, CdTe, CdSe, CdZnTe, ZnTe, HgTe, HgZnTe, HgSe, ZnTe, ZnS, HgCdTe, HgZnSe, or composites thereof.

A photoactive material is optionally doped. For example, $TiO_2$ is optionally doped with Y, V, Mo, Cr, Cu, Al, Ta, B, Ru, Mn, Fe, Li, Nb, In, Pb, Ge, C, N, S, etc., and $SrTiO_3$ is optionally doped with Zr. The photoactive composition may be provided in any suitable morphology or arrangement, for example, including single crystal wafers, coatings (e.g., thin films), nanostructured arrays, nanowires, etc. For example, doped $TiO_2$ may be prepared by sputtering, sol-gel, and/or anodization of Ti. Other doping materials such as photosensitizing agents are illustratively found in U.S. Patent Application Publication No: 2010/0133111.

The metal oxide optionally associates with the substrate via formation of a bond, such as an ionic bond, a covalent bond (e.g., carbon-carbon, carbon-oxygen, oxygen-silicon, sulfur-sulfur, phosphorus-nitrogen, carbon-nitrogen, metal-oxygen, or other covalent bonds), a hydrogen bond (e.g., between hydroxyl, amine, carboxyl, thiol, and/or similar functional groups), a dative bond (e.g., complexation or chelation between metal ions and monodentate or multidentate ligands), Van der Waals interactions, or combinations thereof.

Figure 2:
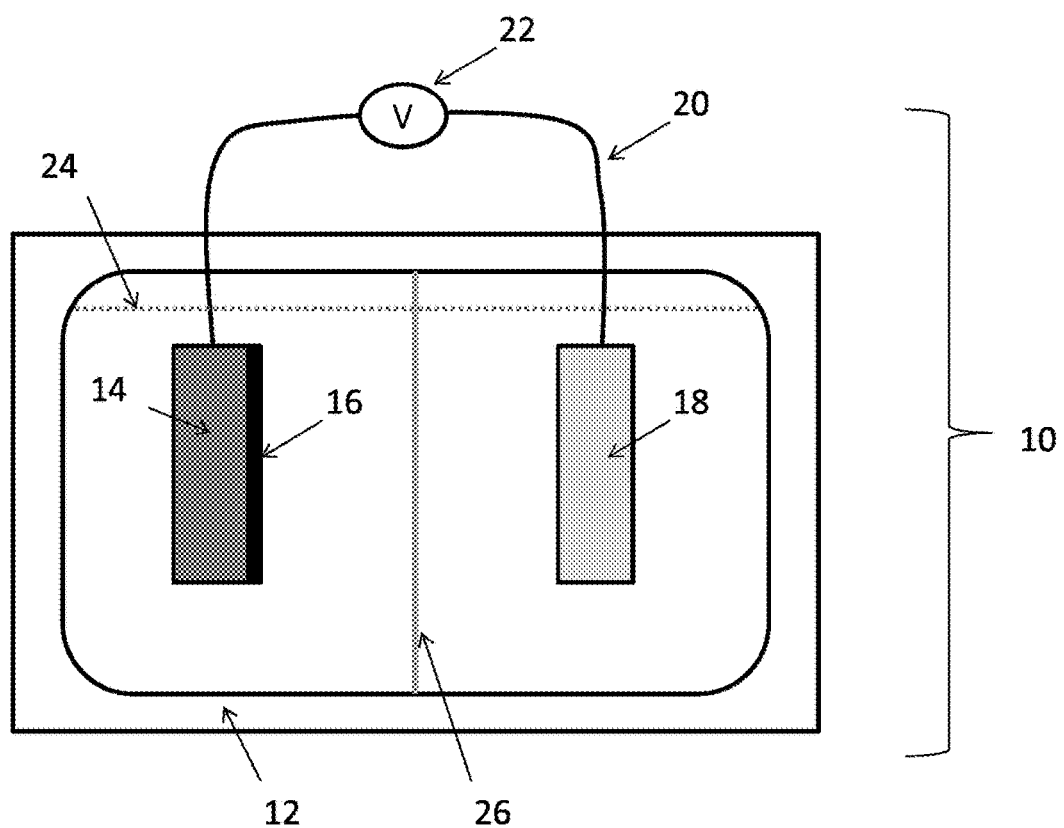
FIG. 2 illustrates a cell for generation of oxygen gas from water at an electrode formed to include a metal oxide catalyst.

An electrode such as an anode associated with a metal oxide formed as in the processes described herein are used in an electrophotochemical cell to produce $O_2$ from water. A typical electrochemical cell is illustrated in FIG. 2. An electrochemical cell 10 optionally includes a case 12 that is either open or enclosed. The case 12 includes an electrolyte 24 that includes water. Illustratively, an electrolyte 24 is aqueous. An anode 14 is present that has been formed to include a coating of metal oxide 16 that is exposed to the water in the electrolyte. A cathode 18 is present. An electrical connection 20 is provided between the anode 14 and cathode 18 that provides for the passage of electrons from the anode to the cathode for subsequent use in the formation of hydrogen gas at the cathode 18. A power source 22 is optionally provided to supply a voltage to the anode 14 to drive the oxidation of the water. Some embodiments include a hydrogen permeable membrane, divider, gel, or other separator between the anode 14 and the cathode 18.

The water used as a substrate is in any form such as liquid or gas (e.g. steam). The water is optionally purified or substantially purified such as distilled water, deionized water, chemical grade water, or includes one or more other components. The purity of the water may be determined using methods such as resistivity, carbon content, UV absorbance, oxygen-absorbance test, limulus ameobocyte lysate test, etc.

In some embodiments, the water may contain at least one impurity. An impurity is optionally any additional component normally found in water from various known sources such as tap water, bottled water, sea water, etc. In some embodiments, water is seawater and one of the impurities may be chloride ions.

An electrode including a metal oxide is optionally used with an electrolyte in the formation of $O_2$, $H_2$, or both. An electrolyte optionally includes water and serves as the water source for the production of $O_2$, $H_2$, or both. The electrolyte is optionally a liquid, a gel, and/or solid. The electrolyte optionally includes methanol, ethanol, sulfuric acid, methanesulfonic acid, nitric acid, mixtures of HCl, organic acids like acetic acid, etc. In some embodiments, the electrolyte comprises mixtures of solvents, such as water, organic solvents, and amines. Illustrative examples of electrolytes are found in U.S. Patent Application Publication No. 2010/0133111.

The production of oxygen gas or hydrogen gas from water is optionally driven by the presence of light of suitable intensity and wavelength to provide sufficient energy to drive the reaction, or by the application of a voltage to an anode to drive the reaction. The application of a voltage to an anode and a cathode will drive the production of oxygen and hydrogen from a water source in contact with the anode and cathode respectively.

In some embodiments, a voltage is applied by the use of an external power source. An external power source is any source of electrical energy such as a battery, connection to a remote source of electrical energy such as a power plant via an electrical grid, or to connection to a green energy source such as wind power generators, photovoltaic cells, tidal energy generators, and combinations of these and other sources. The voltage necessary for the production of oxygen at an anode is reduced when the anode includes a metal oxide catalyst as formed under the processes described herein. A voltage applied to an anode, cathode, or both is optionally from 0.1 to 2 volts, or any value or range therebetween. In some embodiments, a voltage is from 0.5 to 1.8 volts. A voltage is optionally greater than or at 1.2 volts, 1.6 volts, or 1.8 volts. A voltage is optionally continuous, intermittent, or otherwise variable. Illustratively, a metal oxide coated cobalt wire will produce several times more oxygen at the same voltage than traditional platinum wire anodes.

In some embodiments, an energy source is light, such as sunlight or artificial light such as that generated from a xenon lamp or other artificial source. Exposure of an anode with the appropriate composition to convert electromagnetic radiation to electrical energy will serve to drive the oxygen production reaction at the surface of metal oxide. The presence of the metal oxide in these embodiments promotes the electrolysis of the water and the resulting formation of oxygen gas and/or hydrogen gas from a system. Without being limited to one particular theory, an anode that includes a semiconductor material (e.g. n-type semiconductor) dispersed throughout the metal oxide or adjacent to the metal oxide when exposed to light will transfer electrons from the valence band to the conduction band creating holes in the valence band and creating a voltage in the material. These holes may transfer to the surface where they will react with a water molecule via the metal oxide and serve to drive the formation of oxygen gas at the anode surface. The free separated electrons can be conducted by an electrical connection to a second electrode serving as a cathode for the formation of hydrogen ions from the free hydrogen produced at the anode or from other hydrogen sources in the electrolyte such as acids.

The water electrolysis reactions are optionally performed in a container or device suitable for such reactions. Various components of components used in the invention, such as the anode, cathode, power source, electrolyte, separator, container, circuitry, insulating material, gate electrode, etc. can be fabricated by those of ordinary skill in the art from any of a variety of components known to those of skill in the art. Components of the invention can be molded, machined, extruded, pressed, isopressed, infiltrated, coated, in green or fired states, or formed by any other suitable technique. Devices, techniques, methods, assembly, reagents, electrolytes, substrate materials, etc. are illustratively described in U.S. Patent Application Publication 2010/0133111.

Various aspects of the present invention are illustrated by the following non-limiting examples. The examples are for illustrative purposes and are not a limitation on any practice of the present invention. It will be understood that variations and modifications can be made without departing from the spirit and scope of the invention.

Example 1: Formation of a $Co_3O_4$ Catalytic Coating on a Cobalt Substrate

A cobalt foil sheet and cobalt wire is obtained from American Elements, Los Angeles, Calif. The cobalt foil or sheet is placed on the surface of a hotplate pre-heated to 350° C. exposed to air at ambient conditions for 6 hours. The formation of a layer of black oxide is observed on the metal surface. The formation of oxides are repeated with wires or foils of Fe, Cu, and Zn each with similar results.

Figure 3:
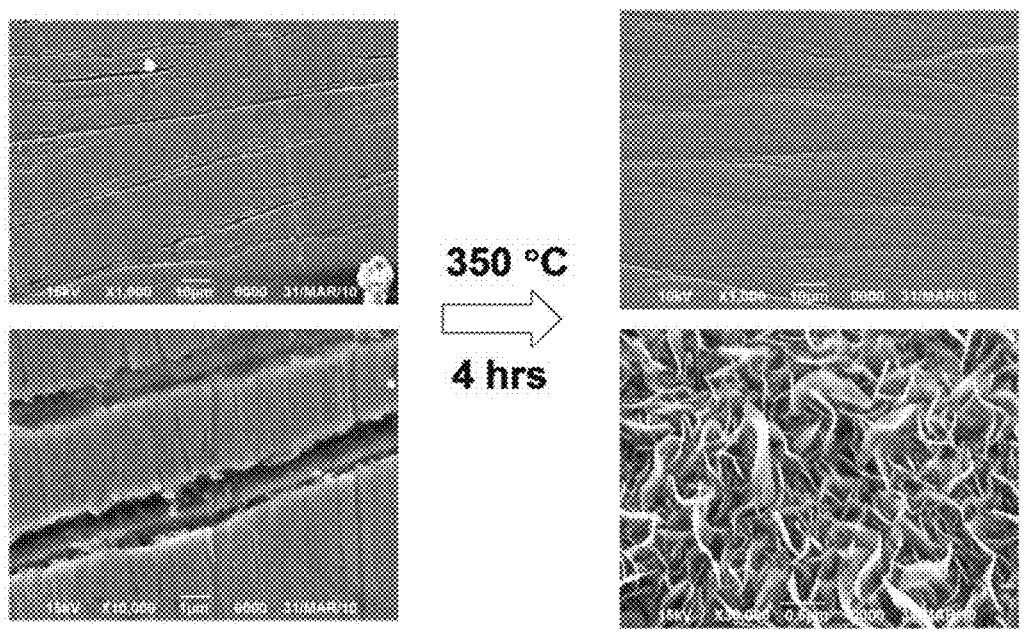
FIG. 3 illustrates the growth of $Co_3O_4$ nano-structures on the surface of cobalt films by heating in an air atmosphere.

The resulting $Co_3O_4$/Co materials are characterized by SEM (scanning electron microscopy) for surface morphology, and by electrochemical measurement to verify catalytic activity for water oxidation. The surface morphology of the surface of a cobalt foil before heating and after heating is illustrated in FIG. 3. Heating in the presence of air produces wall-like structures with dimensions in nanometer range.

Figure 4:
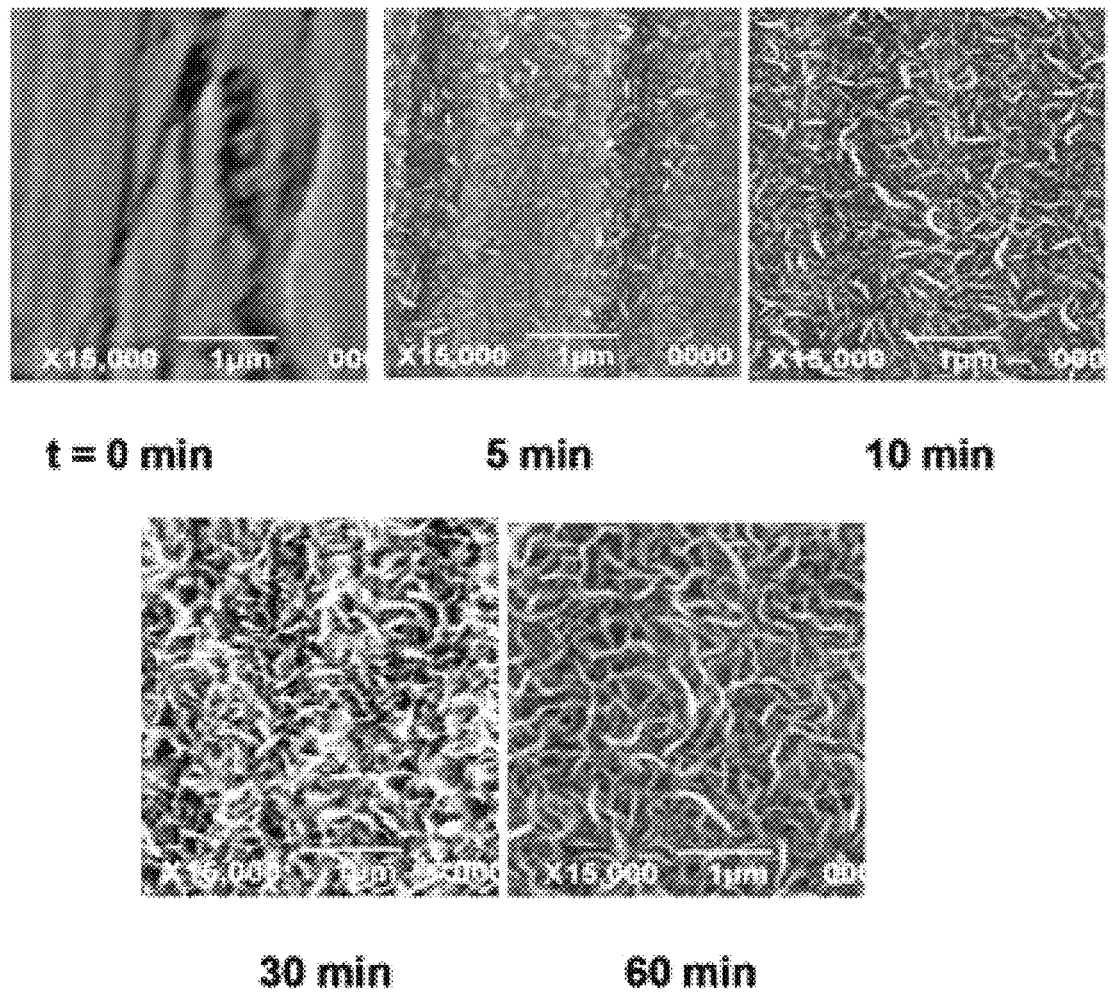
FIG. 4 illustrates the surface morphology change of a Co metal sheet during the process of thermal treatment and the production of $Co_3O_4$ nano-structures at various times.

The Co wires (1 mm in diameter) are subjected to heating at 350° C. for up to 14 hours while the growth of nano-structured cobalt oxide is observed at various intervals during the heating process. As shown in FIG. 4, nano-flakes are observed forming as early as 5 minutes following initial heating and are fully developed at about 2 hours. The walls of the nano-flakes are typically 10~20 nm thick and up to half micrometer in length. FIG. 4.

Example 2: Cyclic Voltammetry

Figure 5:
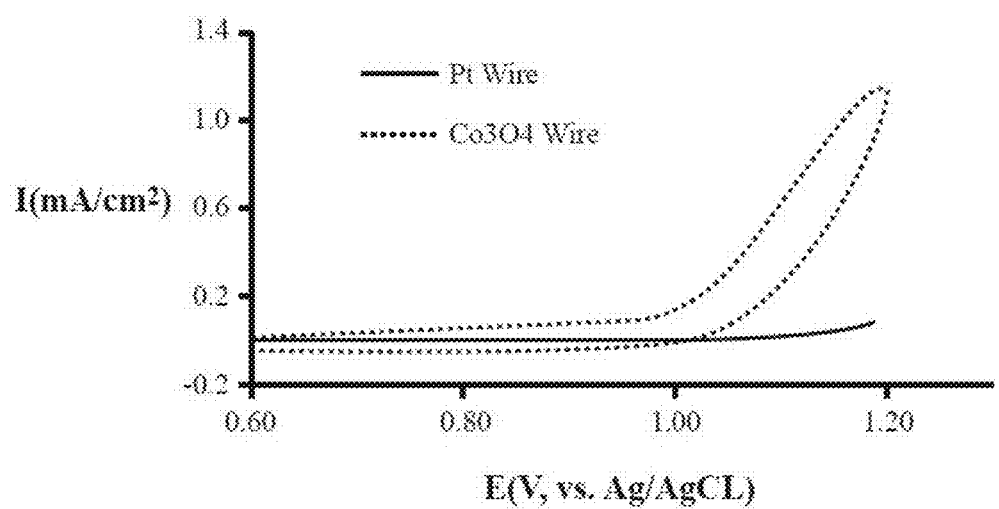
FIG. 5 is a comparison of electrochemical activity of Pt and $Co_3O_4$ nano-structures.

Cyclic voltammetry of the metal oxide based anodes of Example 1 are analyzed in a two chamber cell. As comparison, Pt is also studied as the working electrode. The electrolyte (pH 7.0, phosphate buffer) is purged thoroughly with argon prior to use. A voltage is applied to the electrode and scanned at different scan rates, typically in the range of 10-100 mV/s. CV analyses confirmed that, with similar physical dimensions (apparent surface area), Co wire/$Co_3O_4$ electrode provides much higher current density or much less over potential, as compared to Pt wire electrode. FIG. 5.

Example 3: Oxygen Production at a Metal Oxide Based Anode

Figure 6:
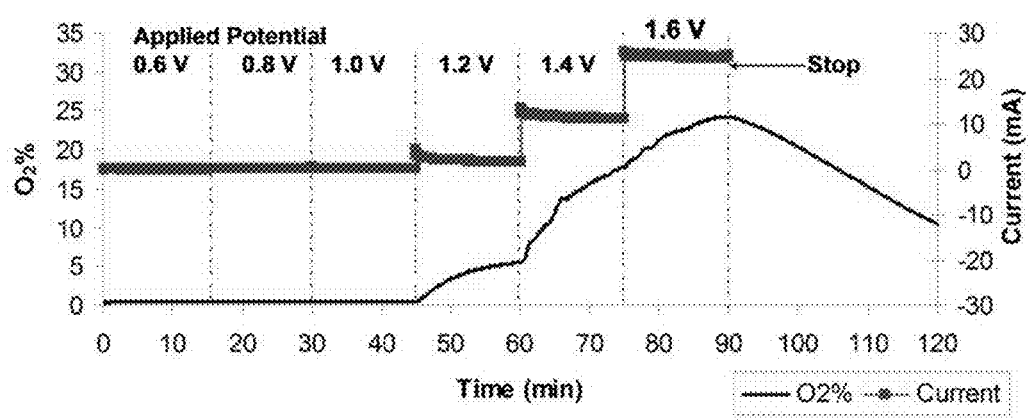
FIG. 6 demonstrates oxygen gas by water electrolysis using an anode formed by heating.

The electrochemical cell of Example 2 is used with an installed an optical oxygen sensor (OceanOptics, Inc., Dunedin, Fla.) next to the Co wire/$Co_3O_4$ electrode. The oxygen sensor is placed ~2 mm over the Co wire/$Co_3O_4$ working electrode. The entire system is sealed from the environment using rubber septa in ground glass joints attached to the electrochemical cell housing and purged of air by bubbling with He gas (or other inert gas, e.g., $N_2$, Ar). The working electrode is posed at 0.6, 0.8, 1.0, 1.2, 1.4 and 1.6 V vs. Ag/AgCl reference electrode for about 15 min under each of the applied potentials. The concentration of oxygen in the electrode is recorded continuously during each test. FIG. 6 illustrates that when the potential of the working electrode is ramped up from 0.6 to 1.6 V at 0.2 V intervals (15 min per step), significant oxygen formation is detected at 1.2 V vs. Ag/AgCl. The trend of the change of oxygen concentration also agrees with the change of current. When no potential is applied to the working electrode (after 90 min), a drop of oxygen concentration is observed. The formation of bubbles around the Co wire/$Co_3O_4$ electrode is also observed by visual inspection corresponding with the measured oxygen production in the system. These data indicate the production of significant amounts of oxygen at the surface of the metal oxide based anode.

Example 4: Oxygen Production Using Ti Cored Anodes

Mesoporous titanium dioxide ($TiO_2$) films are formed on a conducting FTO glass substrate and $RuL_3$ (L=2,2'-bipyridine-4,4'-dicarboxylic acid) dye as a photosensitizing agent is adsorbed to the $TiO_2$ film essentially as described by O'Regan et al., *J. Phys. Chem.*, 1990, 94, 8720-8726. A thin film of cobalt is then deposited onto the sensitized $TiO_2$ substrate by RF sputtering. The resulting material is then heated for an oxidation time of 2 hours in air as in Example 1.

The resulting electrode is then placed in a photochemical based cell that is sealed from the environment and purged of air by bubbling with He gas with the electrode immersed in a 1 M NaOH aqueous electrolyte along with an Ag/AgCl reference and a Pt-wire (as a hydrogen evolving electrode in the other compartment). The resulting cell is then subjected to illumination with a Xe arc lamp to produce AM 1.5 simulated solar irradiation through a transparent optical quartz window and a bias applied and swept from −0.2 to 0.6 V vs. Ag/AgCl reference. An incident photon to current efficiency is measured.

Alternatively, the $TiO_2$ based electrode is biased by an external voltage generating apparatus such as a solar cell to between 0 and 1.5 volts in the absence of light. The oxygen and hydrogen gases generated are withdrawn from the reaction vessel and analyzed using a gas chromatograph connected to a mass spectrometer.

Under both illumination based excitation energy and remote voltage based excitation energy, oxygen and hydrogen production are observed.

Example 5: Oxygen Production Using Doped-Ti Cored Anodes

Titanium oxide based electrodes are doped with nitrogen by sputtering. The material is then subjected to cobalt sputtering to localize cobalt material onto the structure. The structure is then heated as in Example 1 to form a $CoO_2$ nanostructured electrode. The ability of this electrode to catalyze the photoassisted or voltage assisted oxygen production is performed as in Example 4. Successful oxygen and hydrogen production are observed.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process of producing oxygen from water, comprising:
   forming an anode comprising a metal oxide catalyst, said metal oxide comprising a metal ionic species and an oxygen anionic species, said metal ionic species comprising Co, Fe, Zn, or Cu, said metal ionic species is not Ir, said forming comprising heating a metal ionic species to 400 degrees Celsius or less for an oxidation time in the presence of an oxidation gas comprising oxygen; and
   contacting said anode with water in the presence of light of intensity and wavelength to produce oxygen from said water.

2. The process of claim 1 wherein said metal ionic species is $Co^{2+}$ or $Co^{3+}$.

3. The process of claim 1 wherein said heating is from 250 degrees Celsius to 400 degrees Celsius.

4. The process of claim 1 wherein said oxidation time is for 2 hours or more.

5. The process of claim 1 wherein said oxidation time is from 3 to 6 hours.

6. The process of claim 1 wherein said oxidation time is for 4 hours at 350 degrees Celsius.

7. The process of claim 1 wherein said oxidation gas is air.

8. The process of claim 1 wherein said oxidation gas is provided as a purified source.

9. The process of claim 1 wherein said metal ionic species is Co and said oxygen is from air.

10. The process of claim 1 wherein the metal ionic species comprises at least a first and a second type of metal ionic species.

11. The process of claim 1 wherein said anode comprises a substrate, and said metal oxide coating at least a portion of said substrate.

12. The process of claim 11 wherein said substrate is a silicon bead or a CuO nanowire.

13. The process of claim 1 wherein said metal oxide is $Co_3O_4$.

14. The process of claim 1 wherein said metal ionic species is contacted to a substrate prior to said heating.

15. The process of claim 14 wherein said metal ionic species is $Co^{2+}$ or $Co^{3+}$.

16. A process of producing oxygen from water, comprising:
   forming an anode comprising a metal oxide catalyst, said metal oxide comprising a metal ionic species and an oxygen anionic species, said metal ionic species comprising Co, Fe, Zn, or Cu, said metal ionic species is not Ir, said forming comprising heating a solid metal ionic species to 400 degrees Celsius or less for an oxidation time in the presence of an oxidation gas comprising oxygen; and
   contacting said anode with water in the presence of light to produce oxygen from said water.

* * * * *

UNITED STATES PATENT AND TRADEMARK OFFICE
CERTIFICATE OF CORRECTION

PATENT NO. : 10,208,384 B2
APPLICATION NO. : 13/207998
DATED : February 19, 2019
INVENTOR(S) : Hongfei Jia et al.

Page 1 of 1

It is certified that error appears in the above-identified patent and that said Letters Patent is hereby corrected as shown below:

In the Specification

In Column 4, Line 45, delete "Jr" and insert --Ir--, therefor.

In Column 4, Line 51, delete "Jr" and insert --Ir--, therefor.

Signed and Sealed this
Seventh Day of May, 2019

Andrei Iancu
*Director of the United States Patent and Trademark Office*